Aug. 18, 1925.
W. G. NEWTON
LAVATORY BASIN FAUCET
Filed Nov. 29, 1924
1,550,448
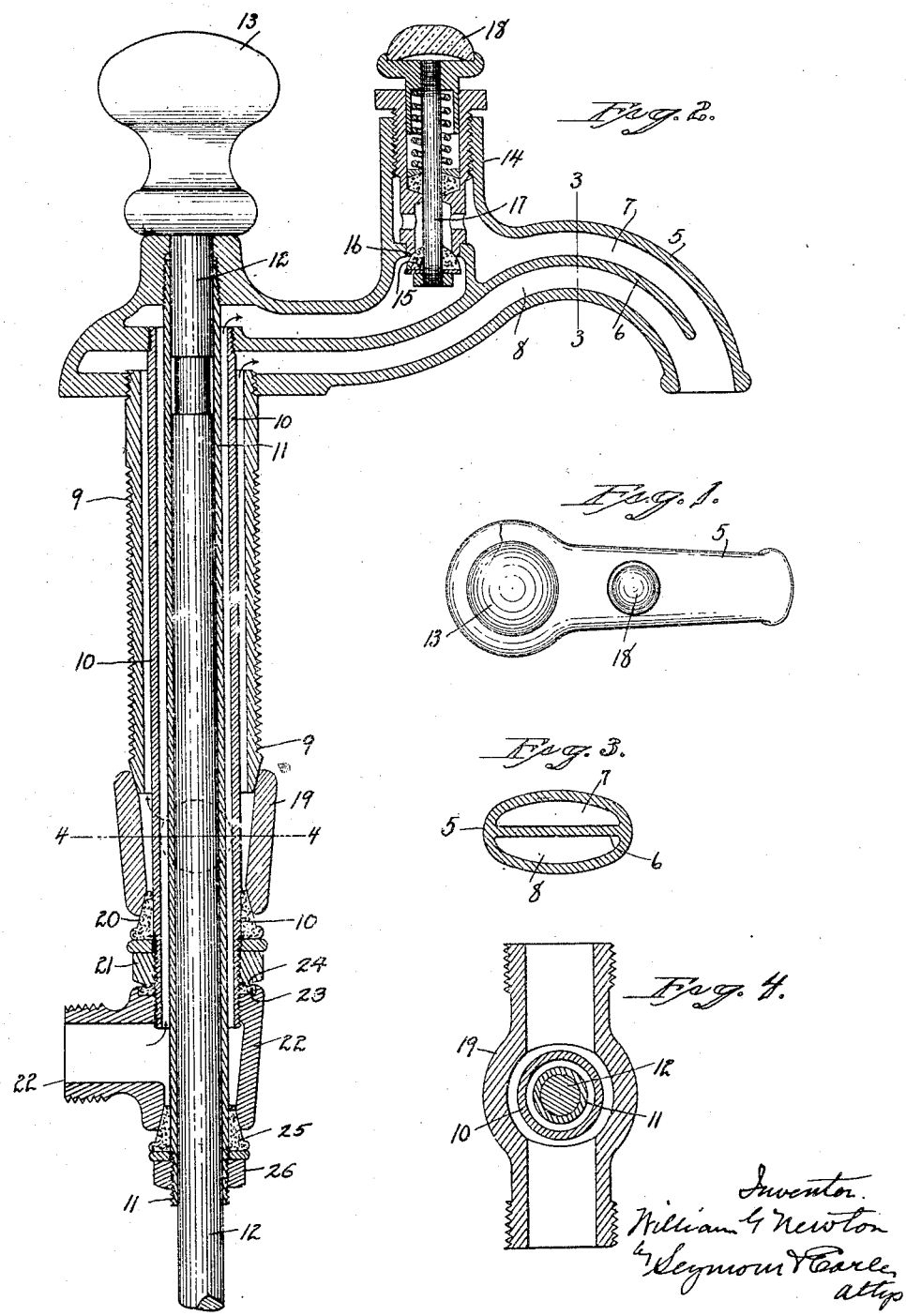

Patented Aug. 18, 1925.

1,550,448

UNITED STATES PATENT OFFICE.

WILLIAM G. NEWTON, OF NEW HAVEN, CONNECTICUT, ASSIGNOR TO THE PECK BROS. & CO., OF NEW HAVEN, CONNECTICUT, A CORPORATION.

LAVATORY-BASIN FAUCET.

Application filed November 29, 1924. Serial No. 752,863.

*To all whom it may concern:*

Be it known that I, WILLIAM G. NEWTON, a citizen of the United States, residing at New Haven, in the county of New Haven and State of Connecticut, have invented a new and useful Improvement in Lavatory-Basin Faucets; and I do hereby declare the following, when taken in connection with the accompanying drawings and the characters of reference marked thereon, to be a full, clear, and exact description of the same, and which said drawings constitute part of this application, and represent in—

Fig. 1, a top or plan view of a faucet constructed in accordance with my invention.

Fig. 2, a view in vertical section of the same, showing the faucet and connections in section.

Fig. 3, a sectional view on the line 3—3 of Fig. 2.

Fig. 4, a sectional view on the line 4—4 of Fig. 2.

This invention relates to improvement in lavatory-basin fixtures, and especially for fixtures for hotel use. A common form of fixture includes a centrally-arranged faucet through which either hot or cold water is discharged and through which faucet the waste-operating stem is moved. In addition to hot and cold water, it is desirable to provide ice water, and this has been done by means of a separately-arranged faucet, which necessitates the formation of an additional hole in the wall adjacent thereto. The object of this invention is to provide for a supply of ice water, as well as hot and cold water, all delivered through the same faucet, and the invention consists in the construction, and the invention consists in the construction as hereinafter described and particularly recited in the claims.

In carrying out my invention, I employ a faucet 5 of prefered design, which is formed with a transverse partition 6 dividing the faucet into an upper chamber 7 and a lower chamber 8. The lower chamber is connected with an externally-threaded sleeve 9, which extends down through the basin. Connected with the lower wall of the upper chamber is a pipe 10 opening into the upper chamber, and extending through this pipe 10 is a tube 11 through which the waste-operating spindle 12 extends, this spindle being provided with the usual handle 13. Opening out of the top of the chamber 7 is a neck 14 mounting a push-button-valve 15, which closes a port 16 in the chamber 7, this valve being of usual construction and operated by providing the valve-spindle 17 with a push-button 18. Hot and cold water are admitted through a coupling 19 having slip-joint connection with the lower end of the sleeve 9 and held in place by a tapered plug 20 supported by a nut 21 turned onto the externally-threaded lower end of the pipe 10. The ends of the coupling are respectively connected with hot and cold water pipes, the water from either passing upward into the lower chamber 8. Secured to the lower end of the pipe 10 is a coupling 22, which is screwed up against the nut 21, and preferably a washer 23 will be inserted in the upper face of the coupling 22, to bear against an annular lip 24 on the lower face of the nut 21. The lower end of the coupling 22 is closed by a plug 25 held in place by a nut 26 screwed onto the lower end of the tube 11.

The coupling 22 is connected with an ice water supply pipe, and ice water will pass upward between the pipe 10 and tube 11 and into the upper chamber of the faucet, so that, when the valve 15 is opened or depressed, the ice water will be discharged through the mouth of the faucet.

I thus provide, in a very simple way, a faucet for the supply of hot or cold water and ice water and in a fixture adapted to be applied to lavatory basins of ordinary construction.

I claim:

1. A faucet formed with a single outlet and with a transverse partition in said outlet, providing an upper and a lower chamber, and a valve in the upper chamber and controlling the passage through it.

2. A faucet formed with a single outlet and with a transverse partition in said outlet, providing an upper and a lower chamber, a supply pipe opening into the lower chamber, and a supply pipe opening into the upper chamber, a tubular neck opening out of the top of the upper chamber, a valve mounted in said neck, said valve adapted to close the passage through said upper chamber.

3. A faucet having a transverse partition, providing an upper and a lower chamber, said lower chamber connected with a sleeve, the upper chamber connected with a pipe extending downward through said support, a tube connected with the faucet and concentric with said pipe, than which it is smaller in diameter, a waste-operating stem extending through said tube, a coupling connected with the lower end of said sleeve and communicating with the lower chamber, a coupling forming connection with the upper chamber and valve in said upper chamber, and a valve controlling the passage therethrough.

4. A faucet formed with a single outlet and with a transverse partition in said outlet, providing an upper and a lower chamber independent of each other, and a valve in the upper chamber and controlling the passage through it.

In testimony whereof, I have signed this specification.

WILLIAM G. NEWTON.